(12) United States Patent
Wheeler et al.

(10) Patent No.: US 11,033,819 B2
(45) Date of Patent: *Jun. 15, 2021

(54) IMPLEMENTING A GRAPHICAL OVERLAY FOR A STREAMING GAME BASED ON CURRENT GAME SCENARIO

(71) Applicant: Microsoft Technology Licensing, LLC, Redmond, WA (US)

(72) Inventors: Joseph Wheeler, Sammamish, WA (US); Christopher M. Novak, Woodinville, WA (US); Aron R. Chavez, Bellevue, WA (US); Tyler Esselstrom, Mercer Island, WA (US); Peter M. Wiest, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/655,439

(22) Filed: Oct. 17, 2019

(65) Prior Publication Data

US 2020/0101382 A1 Apr. 2, 2020

Related U.S. Application Data

(63) Continuation of application No. 16/144,883, filed on Sep. 27, 2018, now Pat. No. 10,569,174.

(51) Int. Cl.
*A63F 13/355* (2014.01)
*A63F 13/53* (2014.01)
(Continued)

(52) U.S. Cl.
CPC .............. *A63F 13/53* (2014.09); *A63F 13/42* (2014.09); *A63F 13/52* (2014.09); *G06K 9/00744* (2013.01); *G06N 20/00* (2019.01)

(58) Field of Classification Search
CPC ..................................................... A63F 13/355
See application file for complete search history.

(56) References Cited

U.S. PATENT DOCUMENTS 8,152,644 B2 4/2012 Kert et al.
8,214,888 B2 7/2012 Noe et al.
(Continued)

FOREIGN PATENT DOCUMENTS

EP 1621238 A1 2/2006
EP 2520999 A1 11/2012
(Continued)

OTHER PUBLICATIONS

"Non Final Office Action Issued in U.S. Appl. No. 16/131,868", dated Jul. 2, 2020, 17 pages.
(Continued)

*Primary Examiner* — Omkar A Deodhar
(74) *Attorney, Agent, or Firm* — Rainier Patents, P.S.

(57) ABSTRACT

A system is configured to implement a graphical overlay in a streaming game based on a current game state. Game data generated by a video game is received including game video in the form of a video stream containing game video frames. The game video is displayed on a display screen of a computing device to represent the video game to a user playing the video game at the computing device. At least one feature of the video game is identified at least in the game data. A user interface (UI) control configuration associated with the identified at least one feature is selected from among a plurality of UI control configurations for the video game and a graphical overlay corresponding to the selected UI control configuration is implemented on the video game in the display screen.

20 Claims, 6 Drawing Sheets

(51) Int. Cl.
*A63F 13/42* (2014.01)
*A63F 13/52* (2014.01)
*G06N 20/00* (2019.01)
*G06K 9/00* (2006.01)

(56) References Cited

U.S. PATENT DOCUMENTS

| | | |
|---|---|---|
| 8,601,555 B2 | 12/2013 | Qin et al. |
| 8,745,401 B1 | 6/2014 | Hintz et al. |
| 8,782,546 B2 | 7/2014 | Haussila et al. |
| 8,814,698 B1 | 8/2014 | Lee |
| 9,227,141 B2 | 1/2016 | May et al. |
| 9,550,113 B2 | 1/2017 | Kulavik |
| 9,937,415 B1 | 4/2018 | Makuch et al. |
| 9,985,786 B1 | 5/2018 | Bhabbur et al. |
| 10,148,640 B2 | 12/2018 | Desai et al. |
| 2005/0039010 A1 | 2/2005 | Grove |
| 2008/0248845 A1 | 10/2008 | Morgan et al. |
| 2010/0125737 A1 | 5/2010 | Kang |
| 2010/0304860 A1* | 12/2010 | Gault ............... H04N 19/42 463/31 |
| 2013/0159375 A1 | 6/2013 | Perry et al. |
| 2013/0227647 A1 | 8/2013 | Thomas et al. |
| 2013/0342460 A1* | 12/2013 | Vincent ............ A63F 13/2145 345/161 |
| 2014/0282878 A1 | 9/2014 | Ignatchenko et al. |
| 2015/0304847 A1 | 10/2015 | Gong et al. |
| 2016/0253651 A1 | 9/2016 | Park et al. |
| 2016/0285871 A1 | 9/2016 | Chathoth et al. |
| 2016/0337131 A1 | 11/2016 | De Andrada et al. |
| 2017/0289617 A1 | 10/2017 | Song et al. |
| 2017/0357967 A1 | 12/2017 | Sykora et al. |
| 2018/0001205 A1 | 1/2018 | Osman et al. |
| 2018/0139257 A1 | 5/2018 | Ninoles et al. |
| 2018/0236361 A1 | 8/2018 | Ninoles et al. |
| 2018/0318716 A1 | 11/2018 | Benedetto |
| 2018/0350180 A1 | 12/2018 | Onischuk |
| 2019/0268319 A1 | 8/2019 | Kurian |
| 2020/0007334 A1 | 1/2020 | Shah et al. |

FOREIGN PATENT DOCUMENTS

| | | |
|---|---|---|
| KR | 101803535 B1 | 11/2017 |
| WO | 2015055014 A1 | 4/2015 |
| WO | 2018009692 A1 | 1/2018 |

OTHER PUBLICATIONS

"Device Type Detection", Retrieved from: https://web.archive.org/web/20190714152305/https://devforum.roblox.com/t/device-type-detection/26112, Jul. 18, 2018, 8 Pages.

"Kerbalcontroller: A Custom Control Panel for Rocket Game Kerbal Space Program", Retrieved from: http://www.instructables.com/id/KerbalController-a-Custom-Control-Panel-for-Rocket/, Jan. 22, 2018, 19 Pages.

"Notice of Allowance Issued in U.S. Appl. No. 16/144,883", dated Sep. 13, 2019, 8 Pages.

"International Search Report and Written Opinion Issued in PCT Application No. PCT/US2019/038359", dated Aug. 21, 2019, 14 Pages.

"International Search Report and Written Opinion Issued in PCT Application No. PCT/US2019/039123", dated Oct. 23, 2019, 18 Pages.

Pelegrino, et al., "Creating and Designing Customized and Dynamic Game Interfaces using Smartphones and Touchscreen", In Proceedings of Brazilian Symposium on Computer Games and Digital Entertainment, Nov. 12, 2014, pp. 133-139.

Pihlajamaki, Eveliina, "From Desktop to Mobile: UI Patterns for User Interface Adaptation in Games", A Thesis Submitted for the Partial Fulfillment of the Requirements for the Master of Science Degree, School of Information Sciences Human-Technology Interaction, University of Tampere, Jun. 2016, 42 Pages.

Torok, et al., "A Mobile Game Controller Adapted to the Gameplay and User's Behavior Using Machine Learning", In Proceedings of 14th International Conference on Entertainment Computing, Sep. 29, 2015, 15 Pages.

Zaman, et al., "Touchscreens vs. Traditional Controllers in Handheld Gaming", In Proceedings of International Academic Conference on the Future of Game Design and Technology, May 6, 2010, 8 Pages.

"Final Office Action Issued in US Appl. No. 16/131,868", dated Dec. 1, 2020, 20 Pages.

"Notice of Allowance Issued in U.S. Appl. No. 16/131,868", dated Feb. 18, 2021, 13 Pages.

* cited by examiner

IMPLEMENTING A GRAPHICAL OVERLAY FOR A STREAMING GAME BASED ON CURRENT GAME SCENARIO

CROSS REFERENCE TO RELATED APPLICATION

This application is a continuation of allowed U.S. application Ser. No. 16/144,883, filed on Sep. 27, 2018, titled "Implementing a Graphical Overlay for a Streaming Game Based on Current Game Scenario," which is incorporated by reference herein in its entirety.

BACKGROUND

Game streaming is a technique of transmitting video game data from a first user device (e.g., "originating" or "source" device) running a video game application to a second user device (e.g., "game play" or "client" device") to enable the user to play the video game using the second user device. For example, data of a video game may be streamed from a desktop computer to a smart phone, tablet, or other user device that has a touch screen (e.g., "touch device") to enable the user to play the video game using the touch screen. Such video game streaming may enable a user to play a video game on a device for which the video game was not originally designed. For instance, game streaming may enable a game that was designed to be played on a video game console (e.g., a Microsoft Xbox®, a Sony PlayStation 4®, a Nintendo Switch®, etc.) using a game controller to be interacted with, and therefore played, by a user on a mobile device.

To permit a user to play a video game on a touch screen device that it was not designed for, a graphical overlay may be presented on the touch screen device. The graphical overlay provides touch screen controls that the user interacts with to play the game, providing a mapping of user interactions with touch controls of the touch device to the physical controls of the source device for the video game. For example, a video game may be designed for a video game console that a user interacts with using a handheld game controller. The video game may be streamed to a touch device, such as a smart phone. As such, a graphical overlay may be used on the touch device to present touch controls for user interaction. The touch screen controls (e.g., graphical buttons, etc.) map to the game controller controls (physical buttons, sticks, etc.). When a graphical overlay on a touch screen presents all of the game controller controls as touch controls, the touch screen can become cluttered, and may present touch controls in locations that block the user's view of the video game.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for implementing a graphical overlay in a streaming game. For instance, a computing device may include a display screen and a video game streaming client that receives game data streamed from a source device. The video game streaming client includes a game engine configured to receive the game data, and to display the game video on the display screen to represent the video game to a user playing the video game at the computing device. The video game streaming client further includes a control configuration determiner that includes a feature identifier and a control configuration selector. The feature identifier is configured to identify at least one feature of the video game at least in the game data. The control configuration selector is configured to select a user interface (UI) control configuration associated with the identified at least one feature from a plurality of UI control configurations for the video game. The game engine implements a graphical overlay corresponding to the selected UI control configuration on the video game in the display screen.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

The features and advantages of the embodiments described herein will become more apparent from the detailed description set forth below when taken in conjunction with the drawings, in which like reference characters identify corresponding elements throughout. In the drawings, like reference numbers generally indicate identical,

DETAILED DESCRIPTION

I. Introduction

The present specification and accompanying drawings disclose one or more embodiments that incorporate the features of the disclosed embodiments. The scope of the embodiments is not limited only to the aspects disclosed herein. The disclosed embodiments merely exemplify the intended scope, and modified versions of the disclosed embodiments are also encompassed. Embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

To permit a user to play a video game on a touch screen device that it was not designed for, a graphical overlay may be presented on the touch screen device. The graphical overlay provides touch screen controls that the user interacts with to play the video game, mapping user interactions with touch controls of the touch device to the physical controls of the source device for the video game. For example, a video game may be designed for a video game console that a user interacts with using a handheld game controller. The video game may be streamed to a touch device, such as a smart phone. A graphical overlay may be presented on the touch device to map the game controller controls (physical buttons, sticks, etc.) with touch screen controls (e.g., graphical buttons, etc.), for touch interaction by the user.

Such graphical overlays are conventionally configured in several ways. For instance, a two-digit configuration can be used where the user applies their two thumbs to controls on the touch screen. The touch input is mapped to gestures that use only those two digits. However, video games that are designed to be used with game controllers, mouse, and/or keyboard may require the user to manipulate numerous physical controls concurrently. Accordingly, a two-digit configuration on a touch screen can make certain video games unplayable as the user cannot provide all the input signals the video game requires.

In another conventional implementation, a one-size-fits-all graphical overlay may be presented that includes a control on the touch screen for every control of a game controller. However, because game controllers typically include numerous controls of varying types, at various locations, such a control layout may present some controls the user does not need to use, as well as taking up most if not all of the entire display screen, which can make some video games unplayable because the user cannot see the actual video game behind the control layout. Accordingly, a one-size-fits-all configuration is not typically practical from a user experience perspective.

In an attempt to solve these issues, control layouts of graphical overlays may be customized for particular game scenarios. However, many video games switch the control layout based on what is going on in the video game (i.e., the "game state" or "game scenario"). For instance, different sets of controls may be used to operate a video game's menu, to cause an in-game character to walk around, to drive a car, to fly, etc. Accordingly, using a set of controls customized to one game scenario is not typically practical because changes in game scenario lead to controls not exactly matching what is needed.

Embodiments overcome these and other issues related to graphical overlays in video game streaming. In an embodiment, machine learning may be used to determine the current game scenario and cause the switching from a prior graphical overlay to a more appropriate graphical overlay designed for the determined current game scenario. In an alternative embodiment, specific identified pixel arrangements and/or sounds of the video game may identify the current game scenario and cause the switching from the prior graphical overlay to the more appropriate graphical overlay for the determined current game scenario.

In embodiments, game data generated by a video game at a first computing device may include game video in the form of a video stream of video frames. The game data may be streamed to a second computing device. The game video is displayed on a display screen of the second computing device to represent the video game to a user playing the video game. During game play, game-related data (e.g., game video frames, game audio data, streams of input events, hardware usage metrics during video game play, further metadata generated during video game play such as log file contents, API (application programming interface) accesses, etc.) may be analyzed to identify one or more game-related features that correspond to the current game scenario, which may have just changed, or may be in the process of changing, from a prior game scenario. In response to the determination, a user interface (UI) control configuration associated with the identified feature(s) is selected from a plurality of UI control configurations for the video game. A graphical overlay corresponding to the selected UI control configuration is implemented on the video game in the display screen. The graphical overlay is configured for that specific current game scenario, having a specific selected set of controls, locations of the controls, etc., configured to make game play more efficient and enjoyable for the user in that game scenario. The user is enabled to interact with the graphical overlay to play the video game in that current game scenario.

As such, embodiments enable the providing of appropriate controls for specific game scenarios based on identified game-related features. In this way, the user experience for a video game streamed to a touch device is very near the same as the user experience for the video game played on the source device for which it was designed.

In an embodiment, a trained machine learning model may be generated and used to enable an appropriate graphical overlay to be selected for game scenarios. In an embodiment, the trained machine learning model may receive game-related data to identify game features, which are used to generate a confidence score indicative of a confidence level that the feature(s) are actually identified, and that the game has switched to an associated game scenario.

Such a trained learning model may be generated in various ways. For instance, to generate such a model, the video game may be executed in a machine learning (ML) application, such as TensorFlow™, to generate training game data that includes a training video stream. Training indications corresponding to the video game may be inputted into the ML application during training game play. In one embodiment, the training indications are inputted manually (e.g., by a game developer). Alternatively, the training indications may be provided automatically, such as by a computer. The trained machine learning model is generated based on the training indications and the generated training game data.

In some instances, such as with racing games, a graphical overlay may require additional modification to accurately simulate the original input device, such as a game controller. Embodiments enable control tuning for the implemented graphical overlay based on user input. For instance, a game input response curve associated with a physical game controller input device may be linearized. The linearized game input response curve may be tuned for a touch control of the graphical overlay such that a tuned input response curve is associated with the touch control. The tuned input response curve determines how the game input responds to user input during game play. In this manner, user experience may be improved for that touch control.

Figure 1:
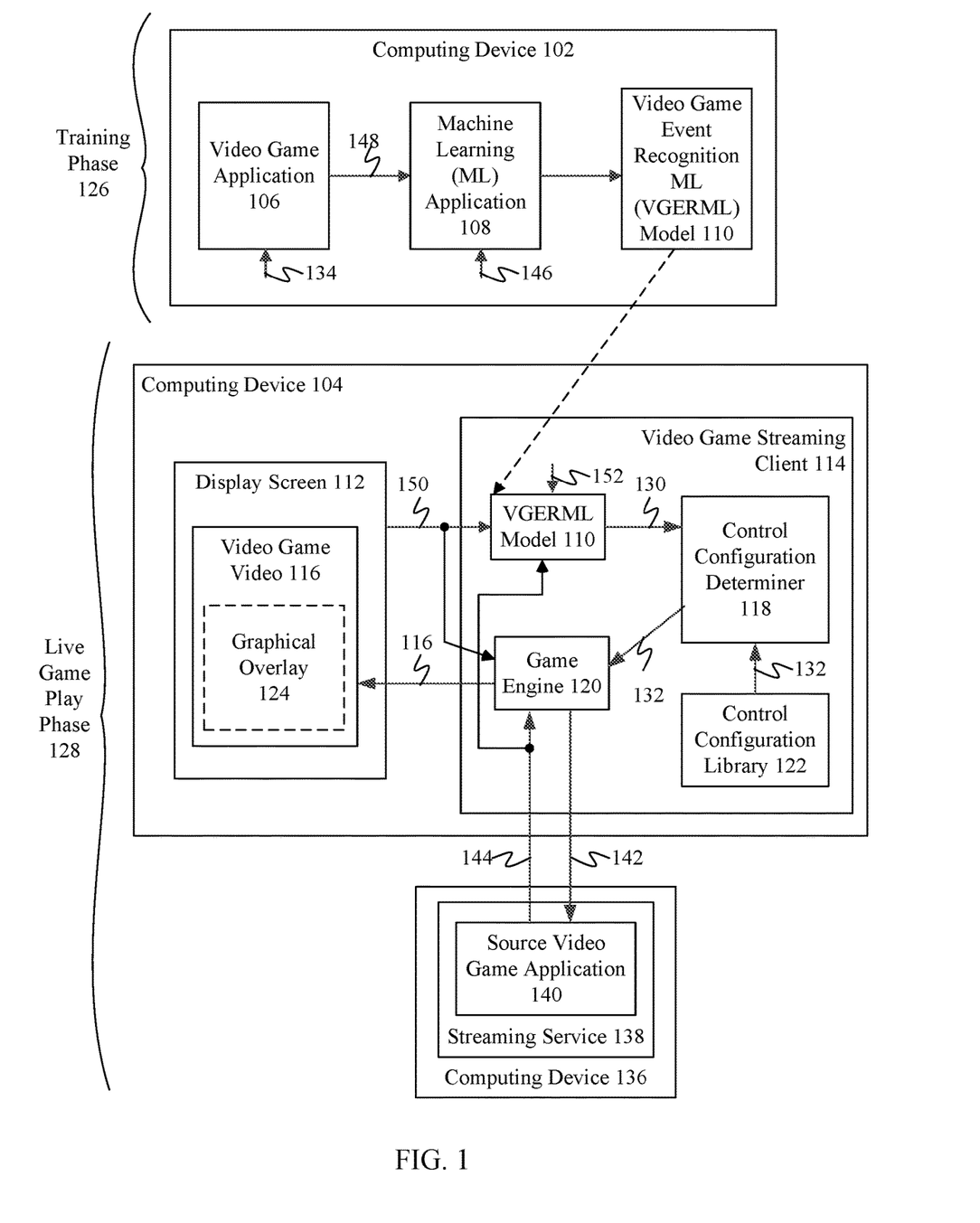
FIG. 1 shows a block diagram of a system for implementing graphical overlays for a streaming video game, according to an example embodiment.

Embodiments for generating and utilizing graphical overlays for streamed video games may be implemented in various ways. For instance, FIG. 1 shows a block diagram of a system 100 for implementing graphical overlays for a streaming video game, according to an example embodiment. As shown in FIG. 1, system 100 includes a first computing device 102 (training device) included in a training phase 126, and a second computing device 136 (game source/originating device) and a third computing device 104 (game play/client device) included in a live game play phase 128. Computing device 102 includes a video game application 106 and a machine learning (ML) application 108. Computing device 136 includes a streaming service 138 that streams a source video game application 140. Computing device 104 includes a display screen 112 and a video game streaming client 114. Video game streaming client 114 includes a video game event recognition machine language (VGERML) model 110, a control configuration determiner 118, a game engine 120, and a control configuration library 122. FIG. 1 is described in further detail as follows.

Computing devices 102 and 136 may each include any type of computing device, mobile or stationary, such a desktop computer, a server, a video game console, etc. Computing device 104 may be any type of mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™, Oculus Rift® by Oculus VR, LLC, etc.), a stationary computing device such as a desktop computer or PC (personal computer), a gaming console/system (e.g., Microsoft Xbox®, Sony PlayStation®, Nintendo Wii® or Switch®, etc.), etc.

Training phase 126 is used to generate a machine learning model used during live game play phase 128 to identify features in game-related data used to select graphical overlays for display. As shown in FIG. 1, video game application 106 is a video game program (e.g., implemented in program code executed by one or more processors). Video game application 106 may be any type of video game, including a causal game, a serious game, an educational game, shooter game, driving game, etc. During execution, video game application 106 generates training game data 148, which includes data representative of the video game during play. Training game data 148 is the game data of the video game generated during training and is presented to the game playing users. For instance, training game data 148 may include video data for display on a display screen, audio data for play by one or more loudspeakers, and/or other types of data generated during the training phase. During training phase 126, video game application 106 also receives user input data 134 from one or more user interface devices used by users, such as a game controller, a touch screen, a keyboard, etc. User input data 134 indicates the actions taken by the user in playing the video game during the training phase (e.g., pushing a button, moving a stick to the right, etc.). User input data 134 is processed by video game application 134 to determine how the video game proceeds, and thus is used in the generation of training game data 148 presented to the user.

ML application 108 is configured to receive and process training game data 148 and training indications 146 to generate a video game event recognition machine language (VGERML) model 110. For example, in an embodiment, ML application 108 may implement a supervised machine-learning algorithm based on the actual game data of training game data 148 and the training input provided in the form of training indications 146 to generate VGERML model 110. VGERML model 110 is a machine learning model generated to be used during live game play phase 128 to identify features in game-related data. The identified features are used to select graphical overlays for display and interaction by the user of a game consumption device different from the source device (computing device 102). As noted above, training indications 146 may be entered manually or by a computer. In embodiments, training indications 146 may indicate the locations of objects displayed in game video frames of the training game data, may indicate the timing of sounds in audio frames of the training game data, and/or may indicate further game-related aspects.

For instance, objects such as weapons, tools, characters, vehicles, portions thereof (e.g., eyes, headlights, taillights, license plates, etc.), and other objects may be displayed by a video game during game play. Objects such as these or others that are determined to be important to particular game scenarios may be flagged during training game play for model training by a game developer user (or automatically), such as by indicating their location in game video (e.g., by the user indicating an object's location by a point, by drawing a box around the object, etc.). Additionally, or alternatively, training indications 146 may include indications of the timing of sounds in audio of the training game data. For instance, the user may indicate the time of the sound of a car engine starting up, of a weapon being used (e.g., a chainsaw running, a gun shooting), of a particular character talking, or the like in the video game that are deemed to correlate to a particular game scenario.

In still further embodiments, training indications 146 may include a stream of input events. For instance, the user performing the model training may indicate particular input events, such as one or more input events that correspond to the user selecting a car from inventory or on screen, one or more input events that correspond to the user selecting a particular weapon, or the like, that correlate to a particular game scenario. In yet further embodiments, training indications 146 may include indications of particular hardware usage. For instance, indicated hardware usage may include an indication of certain processor utilization levels, memory usage levels, disk accesses, or the like, as well as log file contents, API accesses, etc. that correspond to particular game activities, particular objects being rendered to the screen, such as a car, a truck, a boat, a helicopter, a character, or the like, that correlate to a particular game scenario.

ML application 108 generates VGERML model 110 based on training game data 148 and training indications 146. ML application 108 may use any suitable techniques to generate VGERML 110, including supervised ML model generation algorithms such as supervised vector machines (SVM), linear regression, logistic regression, naïve Bayes, linear discriminant analysis, decision trees, k-nearest neighbor algorithm, neural networks, etc. In an embodiment, the generated VGERML model 110 is capable of providing a confidence level indicative of whether a feature is identified in game data. If the confidence level is sufficient (e.g., over 50%), a graphical overlay may be selected corresponding to a game scenario in which that feature (or feature(s)) is identified.

In particular, upon ML application 108 generating VGERML model 110, training phase 126 is complete and live game play phase 128 may begin. To enable live game play phase 128, VGERML model 110 is included in video game streaming client 114 of computing device 104. Video game streaming client 114 is a client-based application used at computing device 104 by a game player to play a streamed instance of the video game during live game play phase 128. Live game play phase 128 is described in further detail as follows.

As noted above, computing device 104 is useable by a user to play a video game that was not designed to be played on computing device 104. The video game may be streamed from a computing device, such as computing device 136. For instance, source video game application 140 may be executed on computing device 136 (e.g., a desktop computer, a game console, etc.). Source video game application 140 is an instance of video game application 106 that may be executed by computing device 136 to enable a game player to play the video game. Furthermore, computing device 136 includes streaming service 138 configured to stream game data 144 of source video game application 140 to another device, such as computing device 104. In particular, streaming service 138 is configured to transmit game data 144 over a network, wireless and/or wired, which may include one or more network cables, a local area network (LAN) such as a wireless LAN (WLAN) or "Wi-Fi"), and/or a wide area network (WAN), such as the Internet.

In an embodiment, streaming service 138 at computing device 136 and video game streaming client 114 at computing device 104 work together to present the video game of source video game application 140 executed at computing device 136 to a user at computing device 104. In particular, streaming service 138 streams game data 144 (e.g., video and audio data) generated by execution of source video game application 140 to video game streaming client 114, which presents the video game to the user at computing device 140. In return, video game streaming client 114 streams user input data 142 received from the user interacting with the video game at computing device 104 to streaming service 138 to provide to source video game application 140 as user input events. In this manner, though source video game application 140 executes at a first computing device (computing device 136), a user can play the video game at a second computing device (computing device 140), even if the video game was not designed for play on the second computing device. Examples of server-client streaming services into which embodiments may be incorporated includes those provided by the Microsoft Xbox® platform, and the Steam® platform provided by Valve Corporation, etc.

In further example detail, as shown in FIG. 1, game engine 120 of video game streaming client 114 receives game data 144 from source video game application 140 streamed by streaming service 138. In an embodiment, video game streaming client 114 is configured to present the video game to the user of computing device 104, including presenting video and audio of the video game at computing device 104, as well as receiving user input events provided by the user at computing device 104. For example, in embodiments, game engine 120 may display video of video data in game data 144 on display screen 112, broadcast audio of audio data (if present) in game data 144 through speakers of computing device 104 and receive input signals from input controls presented to the user of computing device 104. User input data 142 is received by game engine 120 from one or more user interfaces at computing device 104, including display screen 112, which may be a touch screen. User input data 142 indicates the actions taken by the user in playing the video game during the live game play phase 128 (e.g., touching displayed controls on display screen 112). As shown in FIG. 1, game engine 120 may transmit the input signals from the input controls to source video game application 140 as user input data 142. User input data 142 is processed by source video game application 140 to determine subsequent video game execution, and thus is used in the generation of game data 144 presented to the user.

In an embodiment, game data 144 includes game video in the form of a video stream containing game video frames. Display screen 112 is configured to display the game video to represent the video game to a user playing the video game at the computing device. For instance, and as shown in FIG. 1, display screen 112 receives and displays video game video 116 at computing device 104. Furthermore, display screen 112 may display a graphical overlay 124 over video game video 116. Graphical overlay 124 includes an arrangement of one or more graphical controls, referred to herein as a user interface (UI) control configuration, that a game player may interact with on display screen 112 during game play.

Control configuration determiner 118 is configured to select a UI control configuration based on the current game scenario of the video game. To aid in the identification of the game scenario, control configuration determiner 118 is configured to identify one or more features in game data 144. As noted above, the feature may be present in a game video frame, game audio data, a stream of input events provided to the video game, in hardware usage of the computing device, in log files, APIs, etc.

For instance, and as shown in FIG. 1, control configuration determiner 118 may access VGERML 110 to identify a feature 130. As shown in FIG. 1, VGERML model 110 receives game data 144 as input, and may additionally receive input events 150 from display screen 150 and hardware/machine usage data 152 from a task manager or other hardware manager of computing device 104. Input events 150 includes indications of a stream of user input events (UI control interactions) provided by the user at display screen 112. Input events 150 are also received by game engine 120 to be transmitted by source video game application 140 in user input data 142 as described elsewhere herein. Hardware usage data 152 includes indications of hardware of computing device 104 during video game play, including processor utilization levels, memory usage levels, disk accesses, log file contents/accesses, API accesses, or the like, that correspond to particular game activities. Based on game data 144, and optionally on input events 150 and/or hardware usage data 152, VGERML model 110 identifies a feature and associated confidence score 130. Feature and associated confidence score 130 are useable to determine a game scenario by configuration determiner 118.

In an embodiment, if the confidence score has a predetermined relationship with a threshold value, the feature is determined to be present. For instance, a confidence score may have any suitable range, including 0.0 (low confidence) to 1.0 (high confidence). The confidence score may be compared to a predetermined threshold value, such as 0.5, 0.7, etc. If the confidence score is greater than the threshold value, control configuration determiner 118 indicates the feature as identified, and is configured to interface with control configuration library 122 to select the UI control configuration that indicates the identified feature. For instance, and as shown in FIG. 1, control configuration determiner 118 may select a UI control configuration from control configuration library 122. Control configuration library 122 includes plurality of control configurations with associated graphical overlays that may be presented during play of the video game. In the example of FIG. 1, in response to the identified feature, control configuration determiner 118 selected a control configuration 132 that corresponds to graphical overlay 124.

Alternatively, control configuration determiner 118 may access a feature-to-scenario map to identify a game scenario based on identified features. In particular, one or more features in a feature-to-scenario map may be specifically searched for. If the one or more features are found in game data (e.g., a particular sound, one or more specific pixels having a particular attribute, such as a particular color), the identified feature(s) is/are directly mapped by the feature-to-scenario map to a corresponding current game scenario. For instance, in an example video game, when a character is killed, one or more particular screen pixels in game data 144 may change to a black color. These black pixels may be a feature that maps to a particular game scenario in the feature-to-scenario map. Game data 144 may be applied to the feature-to-scenario map, and these pixels, when black, may cause the corresponding change in game scenario indicated in the map (e.g., by selecting/mapping to a corresponding UI control configuration).

Once a UI control configuration is selected, control configuration determiner 118 is configured to implement the associated graphical overlay 124 as an overlay to the video game. For instance, and as shown in FIG. 1, control configuration determiner 118 selects control configuration 132, and provides an indication of selected control configuration 132 to game engine 120. In response, game engine 120 is configured to display graphical overlay 124 of control configuration 132 in display screen 112 as an overlay to video game video 116.

For example, if a tail lights of a car are identified in video data as a feature with high confidence value (e.g., 0.8), the identification of the tail lights may identify the presence of a car, and thus may indicate the game player as having selected a car to drive in the video game. As such, a control configuration having a graphical overlay for driving a car may be selected from control configuration library 122 based on the identified tail lights feature. The graphical overlay may include one or more graphical controls for steering the car, for throttling the car, for braking the car, etc. Upon identification of the tail lights, the graphical overlay may be displayed on display screen 112, and the game player may interact with the graphical overlay to drive the car.

Figure 2:
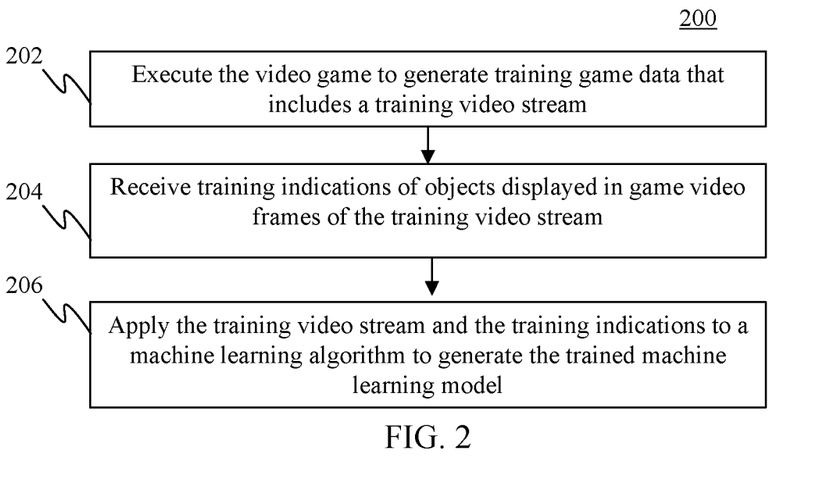
FIG. 2 shows a flowchart for training a machine learning model for video game feature recognition, according to an example embodiment.

In embodiments, system 100 may operate in various ways to perform its functions. For example, FIG. 2 shows a flowchart 200 for generating a trained machine learning model for video game event recognition, according to an example embodiment. In an embodiment, flowchart 200 may be performed by computing device 102. For the purposes of illustration, flowchart 200 of FIG. 2 is described with continued reference to FIG. 1. It is noted that flowchart 200 relates to the recognizing of displayed objects in game video data, but in other embodiments, sounds may be identified in game audio data, input events may be identified in user input data, and machine usage information may be identified in machine usage data in a similar fashion. Any of such data may be used as training data used to generate the machine learning model.

Flowchart 200 of FIG. 2 begins with step 202. In step 202, the video game is executed to generate training game data that includes a training video stream. For instance, with reference to FIG. 1, video game application 106 may be executed in computing device 102 to generate training game data 148. As described above, training game data 148 is the game data of the video game generated during training and is presented to the game-playing users. During training phase 126, video game application 106 also receives user input data 134 from one or more user interface devices used by users, such as a game controller, a touch screen, a keyboard, etc. User input data 134 is received by video game application 106 during execution and is used in the generation of further instances of training game data 148 presented to the user.

For example, a game player may interact with a control to fire an in-game weapon. The game player's interactions with the control are received in user input data 134. Video game application 106 executes the video game to incorporate the weapon firing and any effects thereof, which may be output in training game data 148.

In step 204, training indications are received of objects displayed in game video frames of the training video stream. For instance, with reference to FIG. 1, ML application 108 receives training indications of objects displayed in game video frames of the training game data. For example, ML application 108 may receive indications of a car's tail lights, a car's license plate, and/or other indications of the rear of a car, as training indications. Such training indications are provided as features associated with the rear-end of a car to train the machine learning model to recognize the rear-end of a car, which may be displayed on the display screen for the video game when the user's character is about to enter a car for driving. In such a circumstance, the user may desire the computing device to automatically display a graphical overlay to the display screen that includes controls for driving a car.

Such training indications may be provided in any suitable manner. For example, the game developer may indicate a screen location/region for an object, and an identifier for the object, as a training indication. For instance, a data pair may be provided as a training indication. The game developer may draw a rectangle around a car's tail lights displayed on the display screen in a video frame as a location of an example of car tail lights, and may identify the rectangle as including a car's tail lights and/or rear end. As described above, a rear end of a car may be a desired feature to identify in game video as being indicative of the game player having selected a car for driving in the video game.

In step 206, the training video stream and the training indications are applied to a machine learning algorithm to generate the trained machine learning model. For instance, with reference to FIG. 1, ML application 108 applies the training video stream and the training indications to generate VGERML model 110. Following the above example, VGERML model 110 may be a trained model for a car-related video game, and thus may be trained to be capable of determining that a character is about to drive a car, among other things (e.g., identifying weapons, vehicles, characters, etc.). The machine learning algorithm may receive many various training indications associated with identifying a car's rear end to use to learn how to recognize a car's rear end during video game play.

Note that VGERML model 110 may be generated in various forms. In accordance with one embodiment, ML application 108 may generate VGERML model 110 according to a suitable supervised machine-learning algorithm mentioned elsewhere herein or otherwise known. For instance, ML application 108 may implement a gradient boosted tree algorithm or other decision tree algorithm to generate and/or train VGERML model 110 in the form of a decision tree. The decision tree may be traversed with input data (video data, audio data, input events, machine usage data, etc.) to identify a feature. Alternatively, application 108 may implement an artificial neural network learning algorithm to generate VGERML model 110 as a neural network that is an interconnected group of artificial neurons. The neural network may be presented with input data to identify a feature.

Figure 3:
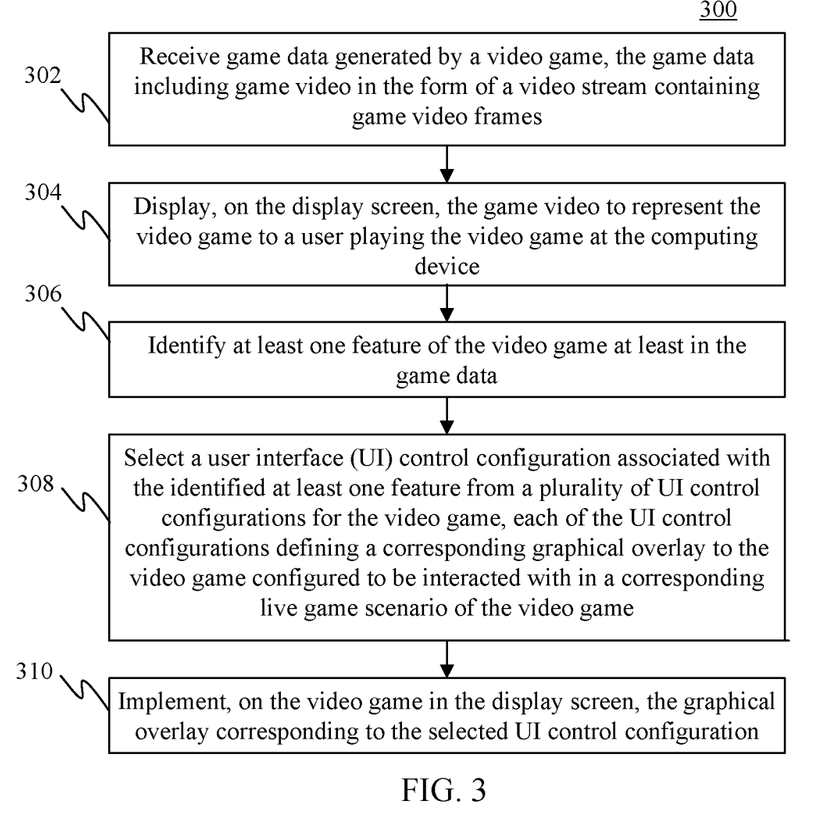
FIG. 3 shows a flowchart for selecting and implementing a graphical overlay on a display screen based on a current game state, according to an example embodiment.
Figure 4:
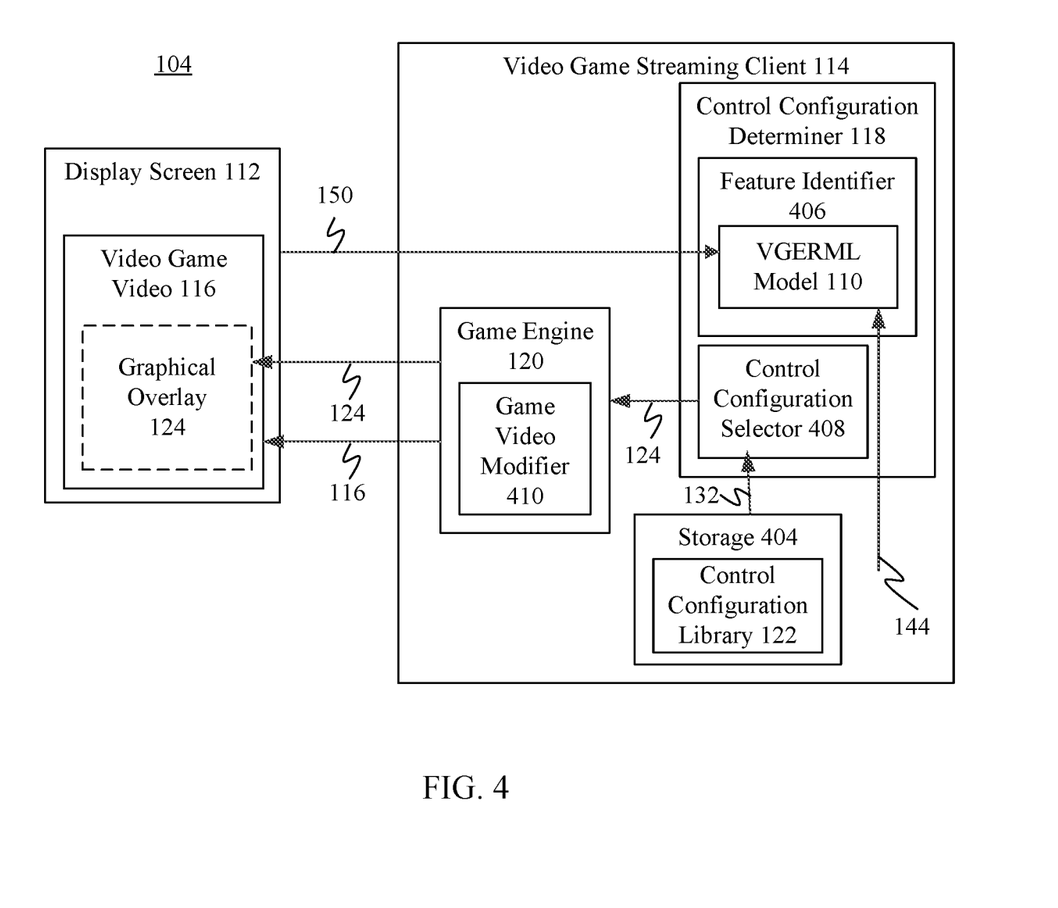
FIG. 4 shows a block diagram of a user device of the system of FIG. 1 configured to select and implement a graphical overlay based on a current video game state, according to an example embodiment.

As noted above, VGERML model 110 is included in video game streaming client 114 to be used to select and implement graphical overlays based on a current game scenario. Any number of such configured video game streaming clients 114 may be implemented in corresponding user devices to enable embodiments therein. Video game streaming client 114 may operate in various ways to perform this function. For example, FIG. 3 shows a flowchart 300 for selecting and implementing a graphical overlay on a display screen based on a current game state, according to an example embodiment. For the purposes of illustration, flowchart 300 is described with continued reference to FIG. 1 and with reference to FIG. 4. FIG. 4 shows relevant portions of computing device 104 of FIG. 1 for selecting and implemented a graphical overlay based on a current video game state, according to an example embodiment.

Video game streaming client 114 and display screen 112 of FIG. 4 operate in a substantially similar manner as described above with respect to FIG. 1. Flowchart 300 may be performed by video game streaming client 114. As shown in FIG. 4, video game streaming client 114 includes control configuration determiner 118, game engine 120, and storage 404. Game engine 120 includes an optional game video modifier 410. Control configuration determiner 118 includes a feature identifier 406, which includes VGERML model 110, and a control configuration selector 408. Storage includes control configuration library 122 of FIG. 1. Other structural and operational embodiments will be apparent to persons skilled in the relevant art(s) based on the following discussion regarding flowchart 300.

Flowchart 300 begins with step 302. In step 302, game data generated by a video game is received, the game data including game video in the form of a video stream containing game video frames. For instance, and with reference to FIG. 1, game engine 120 receives game data 144 including video game video 116 generated by a video game. As shown in FIG. 1, game data 144 may be streamed to video game streaming client 114 from source video game application 140 by streaming service 138.

In step 304, the game video is displayed on the display screen to represent the video game to a user playing the video game at the computing device. For instance, with reference to FIG. 1, video game video 116 is extracted from game data 144 and provided to display screen 112 by game engine 120. Display screen 112 displays video game video 116 to the user playing the video game at computing device 104.

In step 306, at least one feature of the video game is identified in at least in the game data. For instance, with reference to FIG. 3, feature identifier 406 may be configured to identify one or more features of the video game in the game data. Feature identifier 406 identifies features of the video game by use of VGERML model 110. As indicated above, game data 144 may include a stream of game video frames and game audio data. Further game-related data may include user input events 150 and hardware usage data 152. In embodiments, VGERML model 110 may receive any one or more of video data and/or audio data of game data 144, user input events 150, and/or hardware usage data 152, to identify a feature of the video game. As described above, VGERML 110 may generate an indication of a feature and an associated confidence value indicating a likelihood that the indicated feature is present. The identified feature may be any video game feature, including a visual object or a sound. Furthermore, multiple features may be identified simultaneously, or a sequence of features may be identified.

For example, VGERML model 110 may generate feature 130 to indicate a first feature of music changing to a specific track, with a confidence value of 0.9, and a second feature of the screen darkening, with a confidence value of 0.95.

Alternatively, and as described above, feature identifier 406 of FIG. 4 may be configured to identify one or more features of the video game in the game data directly, such as specific pixel arrangements (e.g., specific pixels having specific attributes such as color) and/or sounds, included in a feature-to-scenario map. For example, a specific color of one or more particular pixels and/or a specific sound may be mapped by the feature-to-scenario map to a particular game scenario, resulting in a change of game scenarios (e.g., from a game character walking to the character riding in a car). In such a case, instead of using VGERML model 110, the feature-to-scenario map may be used by control configuration determiner 118. The feature-to-scenario map maps specific game data items (e.g., attributes for particular pixels, sounds, etc.) to corresponding UI control configurations for associated game scenarios. The feature-to-scenario map may be manually constructed (e.g., by a game developer), or may be configured in other ways in embodiments.

In step 308, a user interface (UI) control configuration associated with the identified at least one feature is selected from a plurality of UI control configurations for the video game, each of the UI control configurations defining a corresponding graphical overlay to the video game configured to be interacted with in a corresponding live game scenario of the video game. For instance, with reference to FIG. 4, control configuration selector 408 may select UI control configuration 132 from control configuration library 122 based on feature 130. For instance, UI control configuration 132 may be associated with feature 130 in library 122, such that when feature 130 is identified (with acceptably high confidence), UI control configuration 132 is selected. In an embodiment, UI control configuration 132 defines/includes graphical overlay 124. Graphical overlay 124 is configured for game play in a particular scenario of the video game.

Note that in some embodiments, a single identified feature may be used by control configuration to select a UI control configuration. For example, if tail lights are an identified feature, a UI control configuration for control of a car may be selected. In other embodiments, multiple identified features may be used by control configuration to select a UI control configuration. For instance, multiple car-related features (e.g., tail lights, license plate, rear windshield) may need to be identified in order to select a UI control configuration for control of a car.

In step 310, the graphical overlay corresponding to the selected UI control configuration is implemented on the video game in the display screen. For instance, with reference to FIG. 3, game engine 120 may access graphical overlay 124 (via control configuration selector 408) associated with selected UI control configuration 132. Game engine 120 displays graphical overlay 124 as an overlay to video game video 116 in display screen 112.

Accordingly, upon graphical overlay 124 being displayed in display screen 112, the game player may interact with the displayed controls of graphical overlay 124. Graphical overlay 124 corresponds with the current game scenario, which corresponds to the presence of one or more features identified in game-related data as described above.

Note that in an embodiment, video game modifier 410 may be present to modify the stream of video data received from the video game and displayed as video game video 116. For example, in an embodiment, video game modifier 410 is configured to render an image to be displayed as a frame (or multiple frames) of video game video 116. Video game modifier 410 may composite the image into a received video frame to create a modified video frame in video game video 116. Video game modifier 410 may alternatively generate a completely new video frame that is inserted into the video stream for display as video game video 116, and/or to replace a video frame therein.

As described above, an object displayed during video game play may be indicative of a change in game scenario, and thus may be a trigger to change game overlays. Accordingly, FIG. 6 shows a flowchart 600 for identifying an object in a video game, according to an example embodiment. Flowchart 600 may be performed during step 306 of flowchart 300 (FIG. 3). For purposes of illustration, flowchart 600 is described with continued reference to FIG. 4 and with reference to FIG. 5. It is noted that flowchart 600 is described with respect to the recognizing of displayed objects in game video data, but in other embodiments, sounds may be identified in game audio data as features. Furthermore, features may be identified using input events in user input data, and machine usage data. Embodiments are directed to any of such data, in any combination, used to identify features of a video game.

Figure 5:
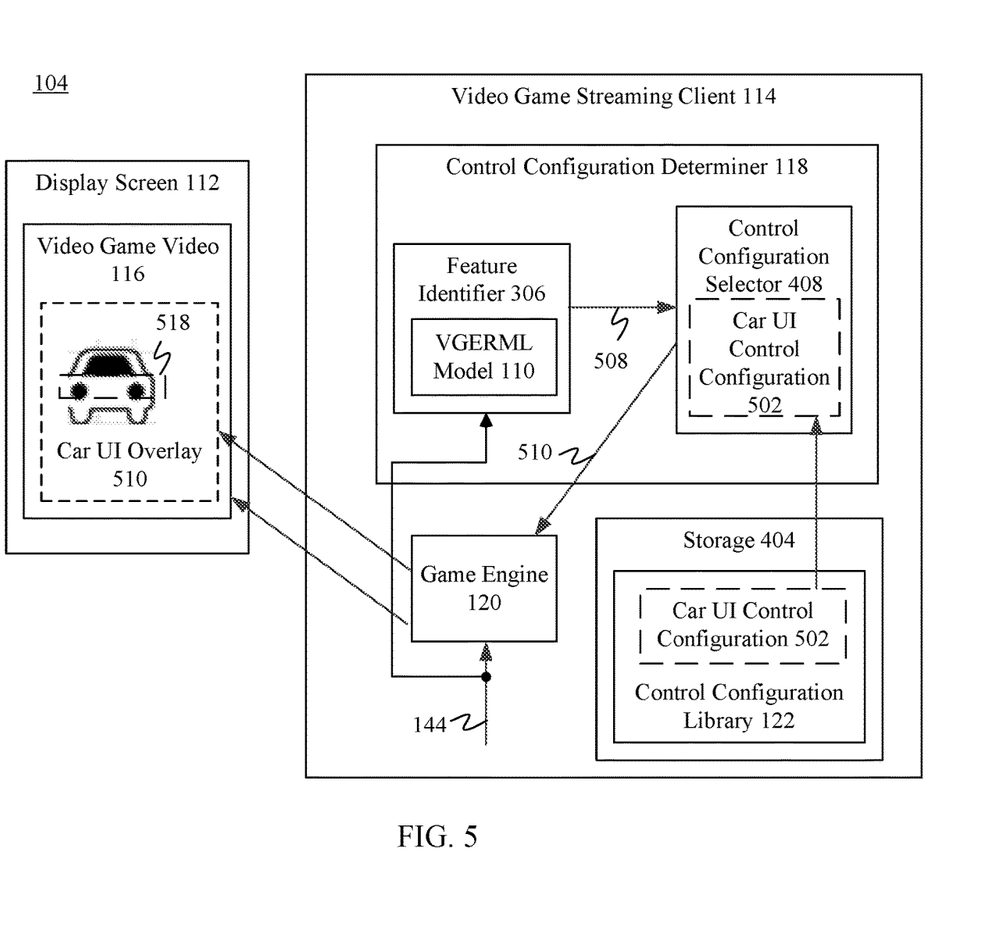
FIG. 5 shows a block diagram of the user device of the system of FIG. 1 configured to identify features in a video game that are used to select a graphical overlay, according to an example embodiment.
Figure 6:
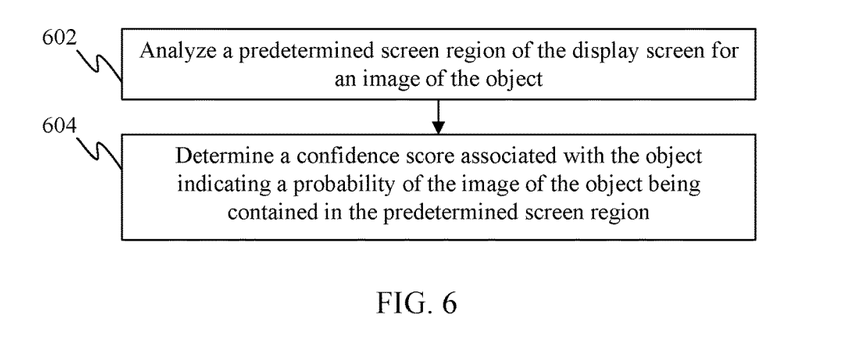
FIG. 6 shows a flowchart for identifying an object in a video game, according to an example embodiment.

FIG. 5 shows a block diagram of relevant portions of computing device 104 of FIG. 1 for identifying features in a video game that are used to select a graphical overlay, according to an example embodiment. Flowchart 600 may be performed by feature identifier 306. Other structural and operational embodiments will be apparent to persons skilled in the relevant art(s) based on the following discussion regarding flowchart 600. Flowchart 600 is described as follows.

Flowchart 600 begins with step 602. In step 602, a predetermined screen region of the display screen is analyzed for an image of an object. For instance, with reference to FIG. 5, VGERML model 110 of feature identifier 302 may analyze game video data 116 (of game data 144 in FIG. 1) in all display regions, including predetermined screen region 518 (shown on display screen 112) for a displayed object. VGERML model 110 may be configured to focus on predetermined screen region 518 due to it being a location where an object of interest is known to appear during game play in correlation with a change of game scenario. For instance, predetermined screen region 518 may have been indicated as a location of the object during training of VGERML model 110 (e.g., flowchart 200 of FIG. 2).

For example, as shown in FIG. 5, predetermined screen region 518 may be the predetermined location for car tail lights to appear when a user controls their in-game character to select and enter a car to drive. Tail lights identified in predetermined screen region 518 correlates highly with the game entering a car driving scenario. As such, VGERML model 110 may identify tail lights of a car in region 518.

In step 604, a confidence score associated with the object is determined indicating a probability of the image of the object being contained in the predetermined screen region. For instance, with reference to FIG. 5, VGERML model 110 determines a confidence score associated with the object indicating a probability of the image of the object being contained in the predetermined screen region.

For example, as shown in FIG. 5, feature identifier 306 outputs a feature 508 generated by VGERML model 110. Feature 508 may indicate a car tail lights were identified and the associated generated confidence score. Control configuration selector 408 receives feature 508, and if the confidence score is sufficiently high (e.g., greater than a predetermined threshold), control configuration selector 408 selects the UI control configuration from library 122 that correlates to the identified feature. In the example of FIG. 5, control configuration selector 408 selects a car UI control configuration 502, which correlates with the identified car tail lights.

Control configuration selector 408 provides a car UI overlay 510 associated with car UI control configuration 502 to game engine 120. Game engine 120 is configured to display car UI overlay 510 over video game video 116 in display screen 112. As such, the user can interact with controls of car UI overlay 510 to drive a car by their in-game character. Car UI overlay 510 is customized for car driving in the video game, rather than being a generic UI overlay, thereby improving the user's game experience.

As noted above, to accommodate certain video games, embodiments enable the tuning of the input response provided by controls of graphical overlays. Game developers may create dead zones and custom response curves for UI controls during the process of targeting the UI controls for a specific targeted input device. For instance, the target input device may be a keyboard, a mouse, or a game controller. Accordingly, when implementing game streaming the input response of a control may be incorrect because the new input control at the client computing devices (e.g., a touch control) is not the originally intended input control, which may be a stick on a game controller. Thus, as described hereinafter, the system provides for the tuning of the input response of UI controls in the client devices.

For example, a two-dimensional control such as a thumbstick has a two-dimensional turning curve, and may have geometry, such as radial, elliptical or square. If the video game is tuned for a game controller, the horizontal axis on a thumbstick may pivot from −1 to +1 to steer the car left or right. The game developer may program a region in the thumbstick middle pivot region (e.g., −0.25 to +0.25) to be a dead zone, where no steering occurs when the thumbstick is positioned there, which may prevent the steering from feeling too twitchy to the user. Furthermore, at the end of the response curve, a more extreme response may be programmed to enable hard turns when the user makes extreme movements with the thumbstick. However, when used on a different device, such as a touch screen, the user will have a poor experience because a touch control will not necessarily perform well with the thumbstick response curve.

As such, in an embodiment, control tuning may be used to flatten the game tuning, with a uniform response for the control that is 1 to 1 with the response within the game. After the flattening, the control may be tuned for the client control, such as a touch screen. Such tuning may include, for example, inserting one or more dead zones having corresponding ranges, clipping regions of curves, changing the response curvature, etc.

Figure 7:
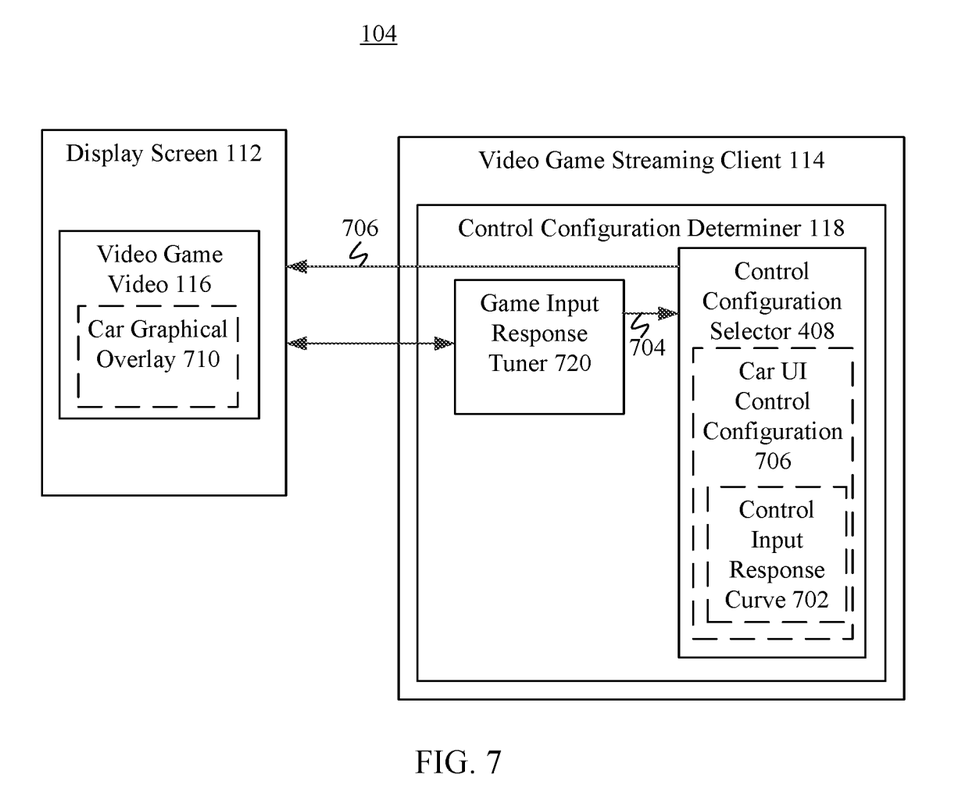
FIG. 7 shows a block diagram of the user device of the system of FIG. 1 configured to enable tuning of a user interface control of a video game graphical overlay, according to an example embodiment.
Figure 8:
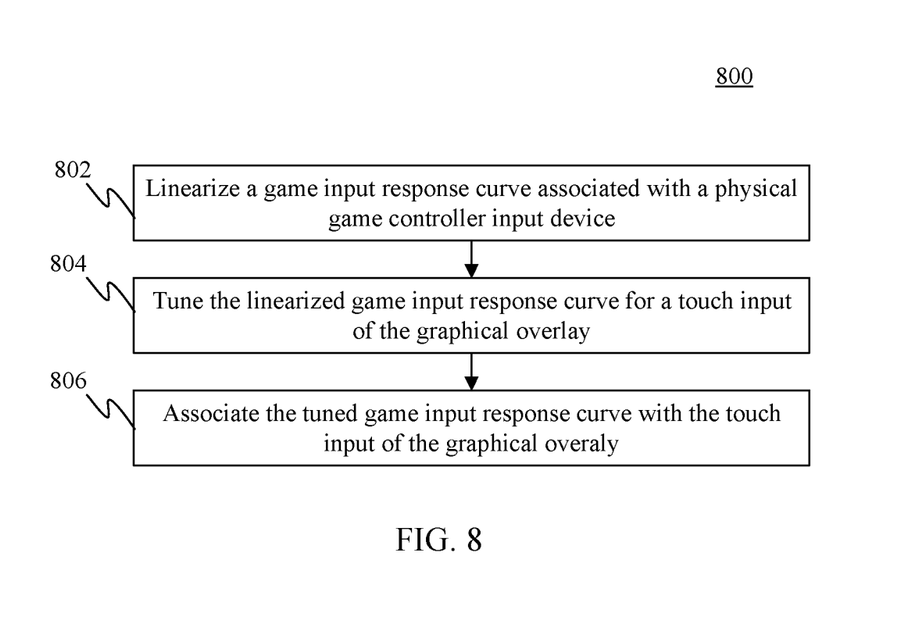
FIG. 8 shows a flowchart for tuning control associated with a touch screen graphical overlay, according to an example embodiment.

Accordingly, in embodiments, control configuration determiner 118 may be configured to enable control tuning. For instance, control configuration determiner 118 may operate according to FIG. 8. FIG. 8 shows a flowchart 800 for tuning control associated with a touch screen graphical overlay, according to an example embodiment. For the purposes of illustration, flowchart 800 is described with continued reference to FIG. 4 and FIG. 5 and with reference to FIG. 7. FIG. 7 shows a block diagram of relevant portions of computing device 104 of FIG. 1 for tuning a user interface control of a video game graphical overlay, according to an example embodiment.

Flowchart 800 may be performed by game input response tuner 720. Other structural and operational embodiments will be apparent to persons skilled in the relevant art(s) based on the following discussion regarding flowchart 800. Flowchart 800 is described as follows.

Flowchart 800 begins with step 802. In step 802, a game input response curve associated with a physical game controller input device is linearized. For instance, with reference to the example of FIG. 7, game input response tuner 720 linearizes a control input response curve 702 associated with a control of a car UI control configuration 706. For instance, control input response curve 702 may have originally been associated with a stick or button of a game controller, and thus may not be linear as described above. Game input response tuner 720 is configured to flatten control input response curve 702 to have an input response of 1:1 (not curved).

In step 804, the linearized game input response curve is tuned for a touch input of the graphical overlay. For instance, with reference to FIG. 7, game input response tuner 720 enables a game developer or other user to input tuning information for control input response curve 702 of the graphical overlay. In embodiments, the tuning information may be in the form of touch input adjustments at display screen 112, which displays car graphical overlay 710 associated with car UI control configuration 706. The game develop may be enabled to adjust the tuning of control input response curved 702 in any manner, including by interacting with one or more tuning controls displayed at display screen 112 by game input response tuner 720. Game input response tuner 720 enables tuning of control input response curve 702 from the flattened version (of step 802), to have any desired curvature, as well as having one or more dead regions if desired.

In step 806, the tuned game input response curve is associated with the touch input of the graphical overlay. For instance, as shown in FIG. 7, game input response tuner 720 associates control input response curve 702 with the associated control of car graphical overlay 710 defined in car UI control configuration 702.

III. Example Computer System Implementation

Computing device 102, computing device 104, video game application 106, ML application 108, VGERML model 110, display screen 112, video game streaming client 114, video game video 116, control configuration determiner 118, game engine 120, control configuration library 122, game input response tuner 720, storage 404, feature identifier 406, control configuration selector 408, game video modifier 410, flowchart 200, flowchart 300, flowchart 600, and flowchart 800, may be implemented in hardware, or hardware combined with one or both of software and/or firmware. For example, computing device 102, computing device 104, video game application 106, ML application 108, VGERML model 110, display screen 112, video game streaming client 114, video game video 116, control configuration determiner 118, game engine 120, control configuration library 122, game input response tuner 720, storage 404, feature identifier 406, control configuration selector 408, game video modifier 410, flowchart 200, flowchart 300, flowchart 600, and flowchart 800, may be implemented as computer program code/instructions configured to be executed in one or more processors and stored in a computer readable storage medium. Alternatively, computing device 102, computing device 104, video game application 106, ML application 108, VGERML model 110, display screen 112, video game streaming client 114, video game video 116, control configuration determiner 118, game engine 120, control configuration library 122, game input response tuner 720, storage 404, feature identifier 406, control configuration selector 408, game video modifier 410, flowchart 200, flowchart 300, flowchart 600, and flowchart 800, may be implemented as hardware logic/electrical circuitry.

For instance, in an embodiment, one or more, in any combination, of computing device 102, computing device 104, video game application 106, ML application 108, VGERML model 110, display screen 112, video game streaming client 114, video game video 116, control configuration determiner 118, game engine 120, control configuration library 122, game input response tuner 720, storage 404, feature identifier 406, control configuration selector 408, game video modifier 410, flowchart 200, flowchart 300, flowchart 600, and flowchart 800, may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 9:
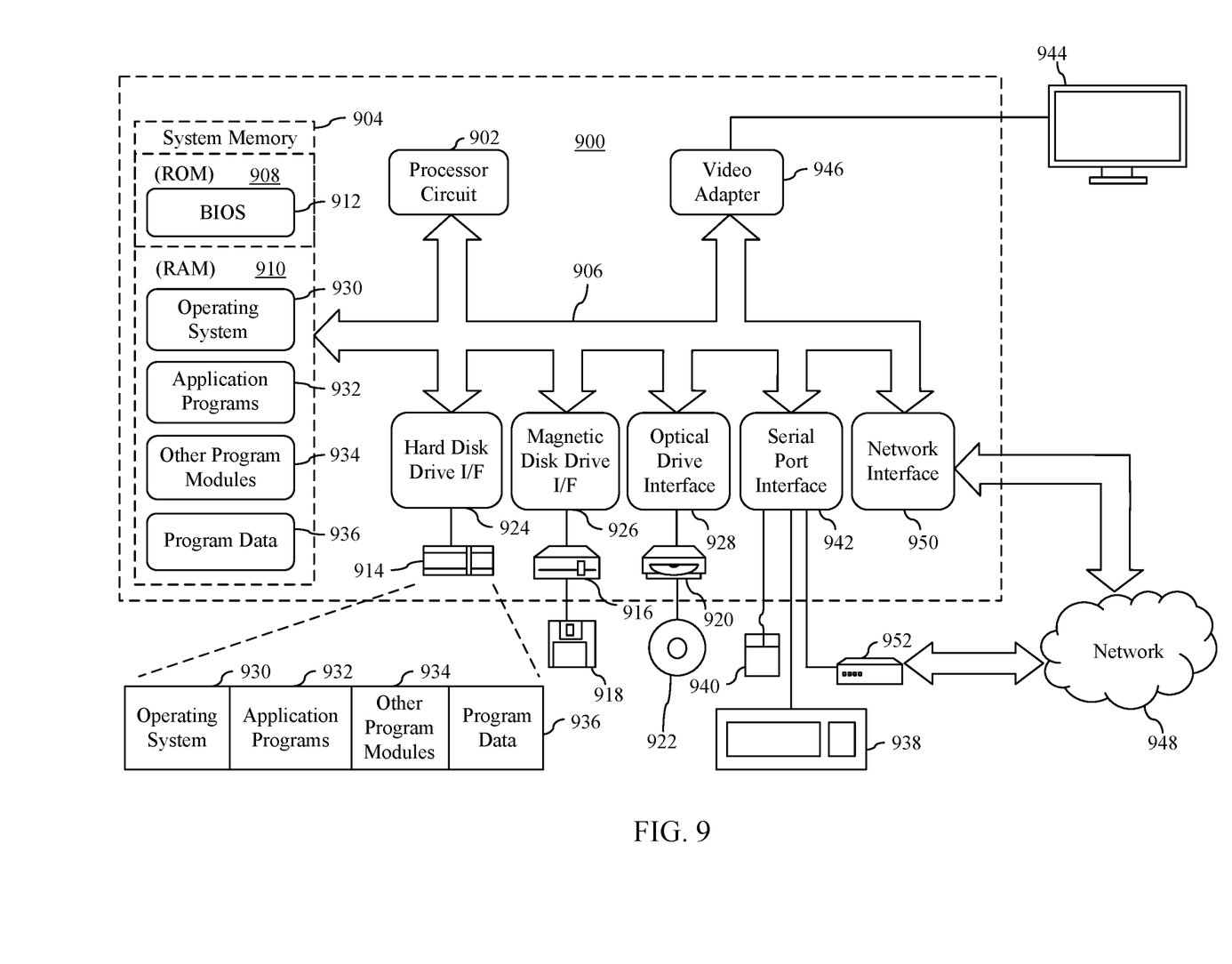
FIG. 9 is a block diagram of an example processor-based computer system that may be used to implement various embodiments.

FIG. 9 depicts an exemplary implementation of a computing device 900 in which embodiments may be implemented. For example, computing device 102 and computing device 104 may each be implemented in one or more computing devices similar to computing device 900 in stationary or mobile computer embodiments, including one or more features of computing device 900 and/or alternative features. The description of computing device 900 provided herein is provided for purposes of illustration, and is not intended to be limiting. Embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random-access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing computing device 102, computing device 104, video game application 106, ML application 108, VGERML model 110, display screen 112, video game streaming client 114, video game video 116, control configuration determiner 118, game engine 120, control configuration library 122, game input response tuner 720, storage 404, feature identifier 406, control configuration selector 408, game video modifier 410, flowchart 200, flowchart 300, flowchart 600, and flowchart 800, and/or further embodiments described herein.

A user may enter commands and information into computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A method in a computing device having a display screen is described herein. The method comprises receiving game data generated by a video game, the game data including game video in the form of a video stream containing game video frames; displaying, on the display screen, the game video to represent the video game to a user playing the video game at the computing device; identifying at least one feature of the video game at least in the game data; selecting a user interface (UI) control configuration associated with the identified at least one feature from a plurality of UI control configurations for the video game, each of the UI control configurations defining a corresponding graphical overlay to the video game configured to be interacted with in a corresponding live game scenario of the video game; and implementing, on the video game in the display screen, the graphical overlay corresponding to the selected UI control configuration.

In one embodiment of the foregoing method, said identifying comprises identifying a feature of the video game in at least one of a game video frame of the game data, game audio data of the game data, a stream of input events provided to the video game, or usage of hardware of the computing device.

In another embodiment of the foregoing method, at least one feature includes an object, and said identifying further comprises: analyzing a predetermined screen region of the display screen for an image of the object; and determining a confidence score associated with the object indicating a probability of the image of the object being contained in the predetermined screen region.

In yet another embodiment of the foregoing method, said analyzing comprises: applying a portion of a game video frame of the video stream containing the image of the object to a trained machine learning model to generate the confidence score.

In yet another embodiment of the foregoing method, the method further comprises executing the video game to generate training game data that includes a training video stream; receiving training indications of objects displayed in game video frames of the training game data that includes the training video stream; and applying the training game data that includes the training video stream and the training indications to a machine learning algorithm to generate the trained machine learning model.

In yet another embodiment of the foregoing method, the display screen is a touch screen, and the method further comprises: tuning control associated with the selected UI control configuration corresponding to the graphical overlay for the touch screen, said tuning comprising: linearizing a game input response curve associated with a physical game controller input device, tuning the linearized game input response curve for a touch input of the graphical overlay, and associating the tuned game input response curve with the touch input of the graphical overlay.

In yet another embodiment of the foregoing method, the game data includes a game video frame that includes an image rendered by the computing device and composited into the game video frame.

A system in a computing device is described herein. The system includes: a video game streaming client comprising: a game engine configured to receive game data generated by a video game, the game data including game video in the form of a video stream containing game video frames; and display the game video on the display screen to represent the video game to a user playing the video game at the computing device; and a control configuration determiner comprising: a feature identifier configured to: identify at least one feature of the video game at least in the game data; and a control configuration selector configured to: select a user interface (UI) control configuration associated with the identified at least one feature from a plurality of UI control configurations for the video game, each of the UI control configurations defining a corresponding graphical overlay to the video game configured to be interacted with in a corresponding live game scenario of the video game, and implement the graphical overlay corresponding to the selected UI control configuration on the video game in the display screen.

In one embodiment of the foregoing system, the feature identifier is further configured to: identify a feature of the video game in at least one of: a game video frame of the game data, game audio data of the game data, a stream of input events provided to the video game, or usage of hardware of the computing device.

In another embodiment of the foregoing system, the at least one feature includes an object, and the feature identifier is further configured to: analyze a predetermined screen region of the display screen for an image of the object; and determine a confidence score associated with the object indicating a probability of the image of the object being contained in the predetermined screen region.

In yet another embodiment of the foregoing system, the feature identifier is configured to: apply a portion of a game video frame of the video stream containing the image of the object to a trained machine learning model to generate the confidence score.

In yet another embodiment of the foregoing system, the display screen is a touch screen, and the video game streaming client further comprises: a game input response tuner configured to tune control associated with the selected UI control configuration corresponding to the graphical overlay for the touch screen, the game input response tuner configured to: linearize a game input response curve associated with a physical game controller input device, tune the linearized game input response curve for a touch input of the graphical overlay, and associate the tuned game input response curve with the touch input of the graphical overlay.

In yet another embodiment of the foregoing system, the game data includes a game video frame, and the game engine includes a game video modifier configured to: render an image; and composite the image into the game video frame.

A computer-readable medium having computer program logic recorded thereon that when executed by at least one processor causes the at least one processor to perform a method, the method comprises: receiving game data generated by a video game, the game data including game video in the form of a video stream containing game video frames; displaying, on a display screen, the game video to represent the video game to a user playing the video game at the computing device; identifying at least one feature of the video game at least in the game data; selecting a user interface (UI) control configuration associated with the identified at least one feature from a plurality of UI control configurations for the video game, each of the UI control configurations defining a corresponding graphical overlay to the video game configured to be interacted with in a corresponding live game scenario of the video game; and implementing, on the video game in the display screen, the graphical overlay corresponding to the selected UI control configuration.

In one embodiment of the foregoing computer-readable medium, said identifying comprises: identifying a feature of the video game in at least one of: a game video frame of the game data, game audio data of the game data, a stream of input events provided to the video game, or usage of hardware of the computing device.

In another embodiment of the foregoing computer-readable medium, the at least one feature includes an object, and said identifying further comprising: analyzing a predetermined screen region of the display screen for an image of the object; and receiving a confidence score associated with the object indicating a probability of the image of the object being contained in the predetermined screen region.

In another embodiment of the foregoing computer-readable medium, said analyzing comprises: applying a portion of a game video frame of the video stream containing the image of the object to a trained machine learning model to generate the confidence score.

In another embodiment of the foregoing computer-readable medium, the method further comprises: executing the video game to generate a training video stream; receiving training indications of objects displayed in game video frames of the training video stream; and applying the training video stream and the training indications to a machine learning algorithm to generate the trained machine learning model.

In another embodiment of the foregoing computer-readable medium, the display screen is a touch screen, and the method further comprises: tuning control associated with the selected UI control configuration corresponding to the graphical overlay for the touch screen, said tuning comprising: linearizing a game input response curve associated with a physical game controller input device, tuning the linearized game input response curve for a touch input of the graphical overlay, and associating the tuned game input response curve with the touch input of the graphical overlay.

In another embodiment of the foregoing computer-readable medium, the game data includes a game video frame that includes an image rendered by the computing device and composited into the game video frame.

V. Conclusion

While various embodiments of the present application have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the present application should not be limited by any of the above-described exemplary embodiments, but should be defined only in accordance with the following claims and their equivalents.

What is claimed is:

1. A method in a computing device having a display screen, the method comprising:
    identifying at least one feature of a video game in game data relating to the video game, the at least one feature reflecting at least one of audio output by the video game, video output by the video game, or input events provided when the video game is being played;
    selecting a user interface control configuration associated with the at least one feature; and
    implementing, on the display screen, a graphical overlay corresponding to the selected user interface control configuration, the graphical overlay configured to be interacted with in a corresponding live game scenario of the video game.

2. The method of claim 1, wherein the method further comprises:
    receiving the audio or video output by the video game from a server executing the video game and streaming the audio or video to the computing device.

3. The method of claim 2,
    wherein the game data includes audio data corresponding to the audio output by the video game;
    wherein said identifying comprises identifying, based on the audio data, an audio feature in the audio output by the video game; and
    wherein said selecting comprises selecting the selected user interface control configuration from a plurality of user interface control configurations for the video game based at least on the audio feature.

4. The method of claim 2, further comprising:
    displaying the video output by the video game on the display screen;
    wherein said identifying comprises identifying an object in the video displayed on the display screen; and
    wherein said selecting comprises selecting the selected user interface control configuration from a plurality of user interface control configurations for the video game based at least on the object identified in the video.

5. The method of claim 1, wherein said identifying comprises:
    identifying a particular feature used to select the selected user interface control configuration in a stream of input events provided to the video game when the video game is being played.

6. The method of claim 1, wherein the at least one feature includes an object, and said identifying further comprising:
    analyzing a predetermined screen region of the display screen for an image of the object; and
    determining a confidence score associated with the object indicating a probability of the image of the object being contained in the predetermined screen region.

7. The method of claim 1, wherein the display screen is a touch screen, the method further comprising:
    tuning control associated with the selected user interface control configuration corresponding to the graphical overlay for the touch screen, said tuning comprising:
        linearizing a game input response curve associated with a physical game controller input device,
        tuning the linearized game input response curve for a touch input of the graphical overlay, and
        associating the tuned game input response curve with the touch input of the graphical overlay.

8. A system implemented in a computing device having a display screen, the system comprising:
    a feature identifier configured to identify at least one feature of a video game in game data relating to the video game, the at least one feature reflecting at least one of audio output by the video game, video output by the video game, or input events provided when the video game is being played; and a control configuration selector configured to:
  select a user interface control configuration associated with the at least one feature, and
  implement a graphical overlay corresponding to the selected user interface control configuration, the graphical overlay configured to be interacted with by a user in a corresponding live game scenario of the video game.

9. The system of claim 8, wherein the feature identifier is configured to receive the audio or video output by the video game from a server executing the video game and streaming the audio or video to the computing device.

10. The system of claim 9, wherein:
the feature identifier is configured to identify an audio feature in the audio output by the video game when the video game is being played; and
the control configuration selector is configured to select the selected user interface control configuration from a plurality of user interface control configurations for the video game based at least on the audio feature.

11. The system of claim 9, wherein:
the feature identifier is configured to identify an object in the video output by the video game when the video game is being played; and
the control configuration selector is configured to select the selected user interface control configuration from a plurality of user interface control configurations for the video game based at least on the object identified in the video.

12. The system of claim 8, wherein the feature identifier is configured to identify a particular feature used to select the selected user interface control configuration in a stream of input events provided to the video game when the video game is being played.

13. The system of claim 8, wherein the at least one feature includes an object, and the feature identifier is configured to:
analyze a predetermined screen region of the display screen for an image of the object; and
determine a confidence score associated with the object indicating a probability of the image of the object being contained in the predetermined screen region.

14. The system of claim 8, wherein the display screen is a touch screen, and the system further comprises:
a game input response tuner configured to tune control associated with the selected user interface control configuration corresponding to the graphical overlay for the touch screen, including being configured to:
linearize a game input response curve associated with a physical game controller input device,
tune the linearized game input response curve for a touch input of the graphical overlay, and
associate the tuned game input response curve with the touch input of the graphical overlay.

15. A hardware computer-readable medium having program code recorded thereon that, when executed by at least one processor, causes the at least one processor to perform acts comprising:
identifying at least one feature of a video game in game data relating to the video game, the at least one feature reflecting at least one of audio output by the video game, video output by the video game, or input events provided when the video name is being played;
selecting a user interface control configuration associated with the at least one feature; and
implementing a graphical overlay corresponding to the selected user interface control configuration, the graphical overlay configured to be interacted with to control the video game in a corresponding live game scenario of the video game.

16. The hardware computer-readable medium of claim 15, wherein the acts further comprise:
receiving the audio or video output by the video game from a server executing the video game and streaming the audio or video.

17. The hardware computer-readable medium of claim 16, wherein:
said identifying comprises identifying an audio feature in the audio output by the video game; and
said selecting comprises selecting the selected user interface control configuration from a plurality of UI user interface control configurations for the video game based at least on the audio feature.

18. The hardware computer-readable medium of claim 16, wherein:
said identifying comprises identifying object in the video output by the video game; and
said selecting comprises selecting the selected user interface control configuration from a plurality of UI control configurations for the video game based at least on the object.

19. The hardware computer-readable medium of claim 15, wherein said identifying comprises:
identifying a particular feature used to select the selected user interface control configuration in a stream of input events provided to the video game while the video game is being played.

20. The hardware computer-readable medium of claim 15, wherein the graphical overlay is implemented on a touch screen, the acts further comprising:
tuning control associated with the selected user interface control configuration corresponding to the graphical overlay for the touch screen, said tuning comprising:
linearizing a game input response curve associated with a physical game controller input device,
tuning the linearized game input response curve for a touch input of the graphical overlay, and
associating the tuned game input response curve with the touch input of the graphical overlay.

* * * * *